United States Patent
Kimball (12)

(10) Patent No.: US 6,462,485 B1
(45) Date of Patent: Oct. 8, 2002

(54) EL DRIVER FOR SMALL SEMICONDUCTOR DIE

(75) Inventor: Robert Allen Kimball, Gilbert, AZ (US)

(73) Assignee: Durel Corporation, Chandler, AZ (US)

( * ) Notice: Subject to any disclaimer, the term of this patent is extended or adjusted under 35 U.S.C. 154(b) by 0 days.

(21) Appl. No.: 09/808,227

(22) Filed: Mar. 14, 2001

(51) Int. Cl.[7] .............................................. H05B 37/02
(52) U.S. Cl. ...................... 315/169.3; 315/205; 315/224
(58) Field of Search ................................ 315/224, 205, 315/169.3; 327/111

(56) References Cited

U.S. PATENT DOCUMENTS

| 5,463,283 A | 10/1995 | Sanderson | 315/209 R |
| 5,780,975 A | 7/1998 | Krafcik | 315/169.3 |
| 5,789,870 A | 8/1998 | Remson | 315/194 |
| 5,982,105 A | 11/1999 | Masters | 315/169.3 |
| 6,038,153 A | 3/2000 | Andersson | 363/97 |
| 6,043,610 A * | 3/2000 | Buell | 315/169.3 |
| 6,087,863 A | 7/2000 | Aflatouni | 327/111 |

* cited by examiner

*Primary Examiner*—David Vu
(74) *Attorney, Agent, or Firm*—Paul F. Wille

(57) ABSTRACT

A driver for an EL lamp includes a voltage boost circuit and an H-bridge output having an AC diagonal and a DC diagonal. An EL lamp is coupled across the AC diagonal. A current path is coupled in series with the DC diagonal and limits current through the EL lamp. The current path is either internal or external to the semiconductor device implementing the driver.

7 Claims, 1 Drawing Sheet

FIG. 1
(PRIOR ART)
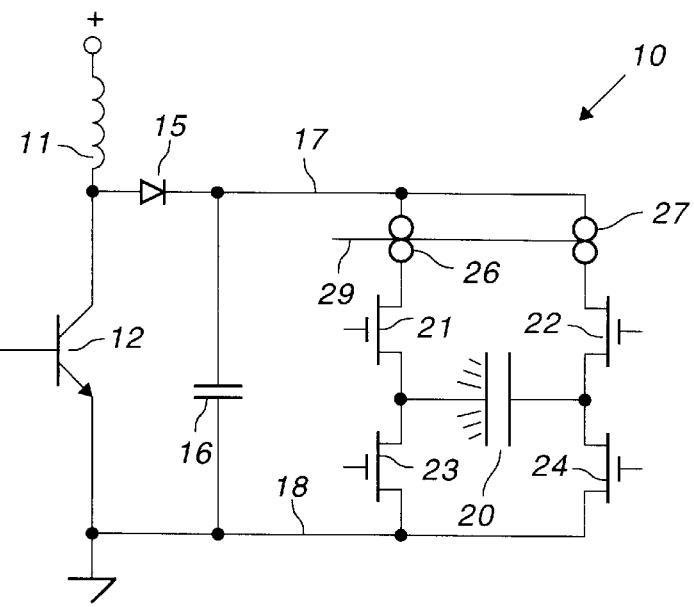
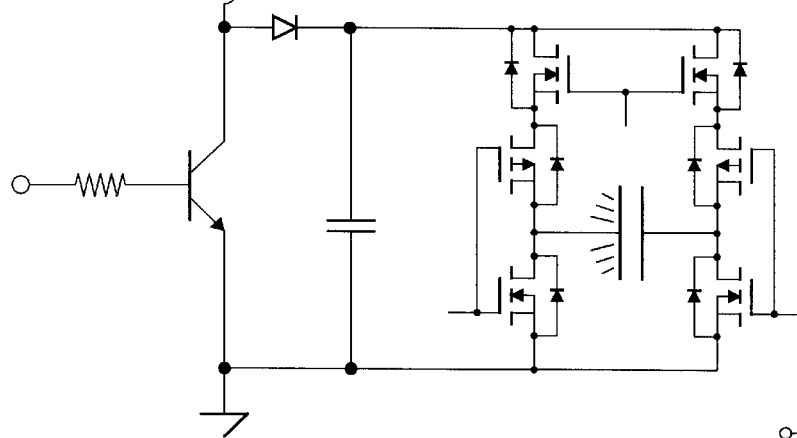
FIG. 2
(PRIOR ART)
FIG. 3
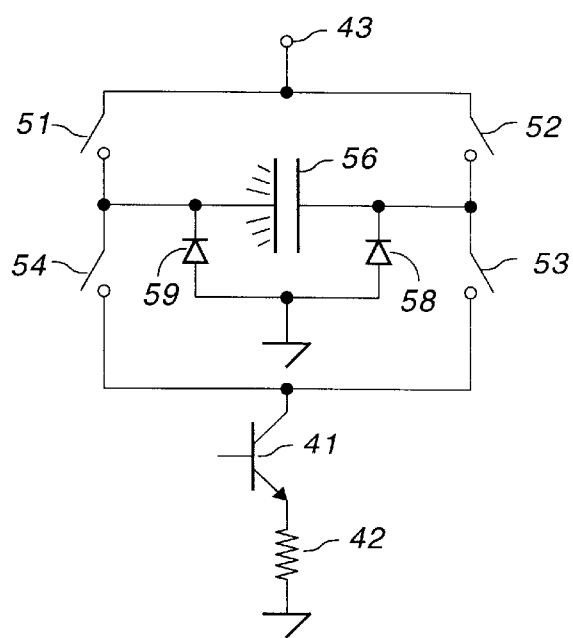

EL DRIVER FOR SMALL SEMICONDUCTOR DIE

BACKGROUND OF THE INVENTION

This invention relates to a battery operated power supply for an electroluminescent (EL) lamp and, in particular, to an EL driver circuit that can be implemented in relatively small die.

An EL lamp is essentially a capacitor having a dielectric layer between two conductive electrodes, one of which is transparent. The dielectric layer may include a phosphor powder or there may be a separate layer of phosphor powder adjacent the dielectric layer. The phosphor powder radiates light in the presence of a strong electric field, using very little current. Because an EL lamp is a capacitor, alternating current must be applied to the electrodes to cause the phosphor to glow, otherwise the capacitor charges to the applied voltage, the current through the EL lamp ceases, and the lamp stops producing light.

In portable electronic devices, automotive displays, and other applications where the power source is a low voltage battery, an EL lamp is powered by a driver that converts direct current into alternating current. In order for an EL lamp to glow sufficiently, a peak-to-peak voltage in excess of about one hundred volts is necessary. The actual voltage depends on the construction of the lamp and, in particular, the field strength within the phosphor powder.

The prior art discloses several types of drivers including an inductive boost circuit having an inductor in series with a switching transistor. Current through the inductor causes energy to be stored in a magnetic field around the inductor. When the current is abruptly shut off, the induced magnetic field collapses, producing a pulse of high voltage. The voltage across the inductor is proportional to L·di/dt. Thus, a low voltage at high current is converted into a high voltage at low current. The voltage on the lamp is pumped up by a series of high frequency, high voltage pulses from the boost circuit.

The direct current produced by the boost must be converted into a low frequency (200–2000 Hz) alternating current in order to power an EL lamp. It is known in the art to switch either the inductor or the EL lamp in such a way as to produce alternating current through the lamp.

It is known in the art to provide a driver for an EL lamp with a boost inverter, a capacitor for storing high voltage, and an H-bridge output coupled to the storage capacitor; see U.S. Pat. No. 5,463,283 (Sanderson). It is also disclosed in this patent to use constant current sources on the high side of the H-bridge. One constant current source is used for each half of the bridge.

It is known in the art to use a series connected resistor and transistor as a discharge circuit; see U.S. Pat. No. 5,982,105 (Masters). It is known that an EL lamp can produce acoustic noise due to the abrupt discharge of the lamp when polarity is reversed. The abrupt discharge also causes a current spike to flow through the lamp that shortens the life of the lamp. It is also known to control the discharge current through an EL lamp to minimize noise generated by the lamp; e.g. U.S. Pat. No. 5,789,870 (Remson) and U.S. Pat. No. 6,038,153 (Andersson et al.). It is also known to discharge an EL lamp before charging the lamp; see the Sanderson patent and U.S. Pat. No. 6,087,863 (Aflatouni).

Commercially available drivers use a pair of controlled current devices for discharging a lamp for a minimum period of time, thereby reducing the noise generated by an EL lamp. The power spikes associated with discharging an EL lamp severely stress the discharge devices. As a result, the devices are robustly made, making the semiconductor die on which the driver is implemented too large for many small packages, e.g. what is known as an MSOP (Mini Small Outline Plastic) package, which is one fourth the size of an SOP package. An MSOP package is approximately three millimeters by five millimeters in size.

It is known in the art to locate a switching transistor on a separate die to reduce die size; e.g. see U.S. Pat. No. 5,780,975 (Krafcik). In this patent, it is disclosed that one of the switching transistors in a boost circuit is separate from the die incorporating the remainder of the driver.

In view of the foregoing, it is therefore an object of the invention to minimize the size of the on-chip discharge devices in a driver for an EL lamp.

Another object of the invention is to provide a high power EL driver in a very small semiconductor package.

A further object of the invention is to provide an EL driver in an MSOP package.

Another object of the invention is to eliminate one of the discharge devices, thereby further reducing the size of the die.

Another object of the invention is to provide an external path for lamp current, thereby still further reducing the size of the die implementing the driver.

SUMMARY OF THE INVENTION

The foregoing objects are achieved in this invention in which a driver for an EL lamp includes a voltage boost circuit and an H-bridge output having an AC diagonal and a DC diagonal. An EL lamp is coupled across the AC diagonal. In accordance with one aspect of the invention, a current path is coupled in series with the DC diagonal and limits current through the EL lamp. In accordance with another aspect of the invention, the current path is external to the semiconductor device implementing the driver.

BRIEF DESCRIPTION OF THE DRAWINGS

A more complete understanding of the invention can be obtained by considering the following detailed description in conjunction with the accompanying drawings, in which:

FIG. 1 is a schematic of a known inverter including a boost circuit and an H-bridge output;

FIG. 2 is FIG. 1 re-drawn to show intrinsic or parasitic diodes; and

FIG. 3 is a schematic of a discharge circuit constructed in accordance with a preferred embodiment of the invention.

DETAILED DESCRIPTION OF THE INVENTION

FIG. 1 is a schematic based upon the Sanderson patent, identified above. Driver 10 includes an inductive boost and an H-bridge output. The inductive boost includes inductor 11 in series with switching transistor 12 between a low voltage supply (+) and ground. Pulses on input 14 cause transistor 12 to switch on and off, producing a series of high voltage pulses that are coupled by diode 15 to optional storage capacitor 16. The terminals of capacitor 16 form high voltage rail 17 and common rail 18. The H-bridge output includes field effect transistors (FETs) 21, 22, 23, and 24 coupled between high voltage rail 17 and common rail 18. The AC diagonal of the H-bridge is coupled to EL lamp 20.

Constant current sources 26 and 27 are controlled on input 29 by a suitable source of pulses (not shown). Sources 26 and 27 limit current through each side of the bridge circuit.

Control circuitry (not shown) for operating driver 10 turns on FETs 21 and 24 simultaneously to charge EL lamp 20 to a first polarity. FETs 21 and 24 turn off and then FETs 22 and 23 turn on to discharge EL lamp 20 through FET 23 and then charge the lamp to the opposite polarity. FETs 22 and 23 turn off and FETs 21 and 24 turn on, discharging EL lamp 20 through FET 24 and then charging the lamp to the first polarity, repeating the process.

There are some subtleties that are not particularly well developed in the Sanderson patent. As known in the art, bipolar transistors and FET transistors are fundamentally different devices. The most obvious difference is that a bipolar transistor is current driven whereas a FET is voltage driven. It is also a known characteristic that, when driven by a relatively large voltage, source-drain current is substantially independent of source-drain voltage, i.e. a FET becomes a constant current source. Thus, as disclosed in the Sanderson patent, sources 26 and 27 are n-channel, depletion mode MOSFETs driven to constant current mode. It is also characteristic of FETs to have a parasitic diode coupling the source and drain. For n-channel devices, the source is the anode of the diode. For p-channel devices, the source is the cathode of the diode. Thus, for example, if the left side of EL lamp 20 is positively charged, then when transistor 23 turns on, the lamp discharges through transistor 23 and the parasitic diode of transistor 24, producing a characteristic exponential discharge curve. The Sanderson patent discloses a regulated boost circuit, which has the effect of turning off the boost between charging cycles. Finally, the presence of constant current sources 26 and 27 essentially requires the use of storage capacitor 16, which would be optional otherwise.

FIG. 2 is a re-drawing of FIG. 1 showing types of FETs and the parasitic diodes.

FIG. 3 is a schematic of a preferred embodiment of the invention. In this embodiment, the DC diagonal of the H-bridge is coupled in series with transistor 41 and resistor 42 between supply 43 and common or ground. Thus, the current path is also part of the charging circuit. Lamp 56 is charged to a first polarity when switches 51 and 53 are closed. After the first charging cycle, switches 51 and 53 open and switch 54 closes, discharging EL lamp 56 through transistor 41, resistor 42, and diode 58. Lamp 56 is charged to the opposite polarity when switches 52 and 54 are closed. After the second charging cycle, switches 52 and 54 open and switch 53 closes, discharging EL lamp 56 through transistor 41, resistor 42, and diode 59.

Diodes 58 and 59 are oppositely poled and coupled in series across the AC diagonal of the H-bridge including switches 51, 52, 53, and 54. The anodes of the diodes are coupled together and to ground. The base of transistor 41 is coupled to a reference voltage, i.e. a relatively fixed voltage. The base-emitter voltage on transistor 41 thus varies with the current through the transistor such that a relatively constant current flows during the charge and discharge cycles.

The base of transistor 41 could be coupled to supply 43, if desired, thereby eliminating the need for one pin. Otherwise, two additional pins are needed, compared to a device that does not include the invention. One pin is one end of the DC diagonal of the H-bridge and the other pin is for the control signal to the base of transistor 41. Diodes 58 and 59 are internal, as are switches 51, 52, 53, and 54. The switches can be bipolar transistors, field effect transistors, or silicon controlled switches such as SCRs.

The entire circuit shown in FIG. 3 can be implemented in a single integrated circuit. If so, the savings in die area results from the fact that a single transistor is used instead of two transistors, as in the prior art. Transistor size is determined largely by peak power, which is the same for the discharge devices used in the invention as it is for the discharge devices used in the prior art. Average power through transistor 41 will be twice that of the prior art (because there is only one transistor) but this has little effect on die size.

In a preferred embodiment of the invention, the current path is external to the IC incorporating the rest of the driver, thereby eliminating two relatively large transistors from the die incorporating the driver. The die can be significantly smaller than in the prior art. Whether internal or external, the current path preferably provides constant current, i.e. includes an active device and may include only an active device (no series resistor).

The invention thus minimizes the size of the on-chip discharge devices in a driver for an EL lamp to provide a high voltage EL driver in a very small die, suitable for an MSOP package. In accordance with another aspect of the invention, an external path is provided for lamp current, thereby further reducing the size of the die implementing the driver and reducing power dissipation in the driver.

Having thus described the invention, it will be apparent to those of skill in the art that various modifications can be made within the scope of the invention. For example, the invention can be implemented using any type of semiconductor switch, e.g. SCR, bipolar transistor, or FET. If FETs are used, advantage can be taken of some of the characteristics of FETs to simplify the circuit. For,example, transistor 41 and resistor 42 can be replaced by a single FET driven in constant current mode. i.e. the series current path can be coupled to either end of the DC diagonal of the H-bridge; i.e. the series current path can be a current source or current sink. As used herein a current "path" refers to a power dissipating element or to a group of power dissipating elements, not to a pure conductor of substantially zero resistance. The invention concerns the H-bridge portion of a driver for an EL lamp. As such, the invention can be used with any "front end," e.g. a boost circuit, with or without regulation, or a rectifying bridge coupled to an AC source.

What is claimed as the invention is:

1. In an integrated circuit including a voltage boost circuit and an H-bridge output, said H-bridge output having an AC diagonal and a DC diagonal, the improvement comprising:

a current path coupled in series with said DC diagonal for controlling current through said AC diagonal.

2. The integrated circuit as set forth in claim 1 wherein said current path is coupled between said DC diagonal and ground.

3. The integrated circuit as set forth in claim 1 wherein said current path includes a transistor and a resistor coupled in series.

4. The integrated circuit as set forth in claim 3 wherein said resistor is coupled between said transistor and ground and said transistor acts as a constant current sink.

5. The integrated circuit as set forth in claim 1 and further including: a pair of oppositely poled diodes coupled in series across said AC diagonal.

6. The integrated circuit as set forth in claim 1 wherein said current path is external to said integrated circuit.

7. The integrated circuit as set forth in claim 1 and further including an electroluminescent lamp coupled to said AC diagonal.

* * * * *